United States Patent [19]
Park et al.

[11] Patent Number: 6,058,437
[45] Date of Patent: May 2, 2000

[54] D.M.A. DEVICE THAT HANDLES CACHE MISSES BY MANAGING AN ADDRESS OF AN AREA ALLOTTED VIA A DAEMON PROCESSOR

[75] Inventors: Jun Hee Park; Kyeong Deok Moon; Tae Geun Kim; Chang Soon Park, all of Daejeon, Rep. of Korea

[73] Assignee: Electronics and Telecommunications Research Institute, Daejeon, Rep. of Korea

[21] Appl. No.: 09/007,818

[22] Filed: Jan. 15, 1998

[30] Foreign Application Priority Data

Aug. 4, 1997 [KR] Rep. of Korea ............ 97-37246

[51] Int. Cl.[7] ............................................ G06F 13/28
[52] U.S. Cl. ..................... 710/22; 709/212; 710/35; 710/52; 711/118; 711/133; 345/511
[58] Field of Search ............... 711/118, 133, 711/202, 207; 709/212; 345/511; 710/22, 35, 52

[56] References Cited

U.S. PATENT DOCUMENTS

| | | | |
|---|---|---|---|
| 5,128,878 | 7/1992 | Gore et al. | 395/502 |
| 5,301,287 | 4/1994 | Herrell et al. | 711/202 |
| 5,349,651 | 9/1994 | Hetherington et al. | 711/207 |
| 5,442,571 | 8/1995 | Sites | 711/133 |
| 5,623,626 | 4/1997 | Morioka et al. | 711/118 |
| 5,696,897 | 12/1997 | Dong | 714/15 |
| 5,701,516 | 12/1997 | Cheng et al. | 710/22 |
| 5,790,130 | 8/1998 | Gannett | 345/511 |
| 5,909,546 | 6/1999 | Osborne | 709/212 |
| 5,917,503 | 6/1999 | Zakharia et al. | 345/506 |
| 5,931,925 | 8/1999 | McNabb et al. | 710/52 |

OTHER PUBLICATIONS

Incorporating Memory Management into User–Level Network Interfaces; Matt Welsh, Anindya Basu, Thorsten von Eicken; Department of Computer Science; Cornell University; pp. 1–10.

U–Net: A User–Level Network Interface for Parallel and Distributed Computing; Thorsten von Eicken, Anindya Basu, Vineet Buch, and Werner Vogels; Department of Computer Science; Cornell University; Ithaca, NY 14853; Aug. 21, 1995; pp. 1–14.

Primary Examiner—Thomas C. Lee
Assistant Examiner—Tammara Peyton
Attorney, Agent, or Firm—Antonelli, Terry, Stout & Kraus, LLP

[57] ABSTRACT

A direct memory access processing device of communication equipment which has a main memory device and communication equipment including queues storing information related to communications between processs and management tables storing physical addresses in the main memory device allotted to the process, and when information to be managed by a destination process is externally transferred to the communication equipment, retrieves information about the destination process stored in the queues from the management tables, thereby storing the received information in the addresses of the main memory device via a direct memory access, the main memory device comprising an area allotted to a process for the immediate use, and a daemon process wholly responsible for managing the area, and the management table comprising a process record for managing the address of the area allotted in the main memory device for the immediate use.

4 Claims, 5 Drawing Sheets

D.M.A. DEVICE THAT HANDLES CACHE MISSES BY MANAGING AN ADDRESS OF AN AREA ALLOTTED VIA A DAEMON PROCESSOR

BACKGROUND OF THE INVENTION

1. Field of the Invention

The present invention relates to a DMA (Direct Memory Access) processing device for communication equipment and a method thereof. More particularly, the invention relates to such a device and method to decrease the retransmission of messages that may be caused by the absence of DMA information for communication equipment in the local area network.

2. Discussion of Related Art

A high speed user-level network usually employs DMA accesses so that messages can be sent to user-space directly from communication equipment. To realize the DMA accesses, communication equipment has to hold the virtual address of a space to store the ID and messages of user-process and the physical address of a main memory device corresponding to these two data, in the form of tables which is termed TLB (Translation Look-aside Buffer). On receiving a message, communication equipment searches for the physical address of the main memory device from its TLB, and sends the message to the main memory device indicated by the physical address via DMA accesses.

Hereafter, a DMA processing method for communication equipment according to prior art is described in detail with reference to the attached drawings.

FIG. 1 is a schematic of a DMA processing device between communication equipment and main memory device, and FIG. 2 is a flow diagram illustrating a DMA processing method between them.

Referring to FIG. 1, communication equipment 102 and main memory device 101 exchange information via system buses and the main memory device 101 allots a defined area 104 to the respective processs.

Memory 103 stores all types of information of communication equipment 102 and includes a send queue 105 storing the size of message to be sent via communication equipment 102, and a virtual address; and a receive buffer reservation queue 106 holding information regarding the space where the message received by communication equipment 102 will be stored. The area 104 of the main memory device allotted to each of different processes includes a receive queue 107 having information regarding the space where the message arrived through communication equipment 102 is stored; a send buffer 108 storing the message to be sent via communication equipment 102; a free buffer 109 storing the message that will arrive via communication equipment 102; and a receive buffer 110 storing the message received through communication equipment 102.

Send queue 105 and receive buffer reservation queue 106 store the process ID, and the starting address (virtual address) and size of the buffer, while receive queue 107 stores the starting address (virtual address) and size.

FIG. 2 is a flow diagram illustrating communication equipment 103 as described above in more detail, that is, a DMA processing between communication equipment 103 and main memory device 101.

Referring to FIG. 2, communication equipment 103 includes a TLB 201, and a queue 202 for storing information about the process for processing and managing messages externally applied, and a kernel 205 for helping the DMA processing between communication equipment 103 and main memory device 101 is provided on the outside of communication equipment 103. TLB 201 stores the IDs and virtual addresses (P1.V_addr, P2V_addr, P1.V_addr, ..., P7.V_addr) for the processss related to the communication equipment 103, and the physical addresses (phypage frame #) for the main memory device 101.

When a message 203 for a process P1 is received by queue 202 (S201), communication equipment 103 searches for the virtual address of the page for main memory device 101 allotted to store the ID and message of process P1, thereby searching for TLB 201 and obtaining the physical address of the page for the main memory device (S202, TLB hit). Then, it directly gives an access to the page of the main memory device with the address via DMA (S203) and stores the received message 203.

These are all carried out by the processor of communication equipment, thus without spending too much time and missing the received messages.

However, when a message 204 is being transferred to process Pn with communication equipment (S204), communication equipment 103 cannot search for either TLB 201 or physical address 203 since there is no TLB for the process Pn (S205, TLB miss). In such case, communication equipment 103 has to require the kernel 205 to process the TLB miss (S206). A processing routine with kernel 205 takes a long time and results in missing the received message 206, which makes it necessary to retransmit the message and causes a significant deterioration of network performances.

It has hardly been secured with the current technologies that the TLB of communication equipment holds information about the page of the main memory device of the process at which the transferred messages arrive finally. A potential TLB miss as described above might occur and information about the page of the main memory device of the process has to be obtained through the aid of the kernel, in which case, the messages are possibly lost in sending and receiving a large data because of requirement for a long time, causing a trouble to retransmit the missed messages. It is thus required to have a process wholly responsible for the reception of messages in case of TLB misses in order to prevent the absence of information about the page of the main memory device in communication equipment and reduce the necessity to retransmit messages.

SUMMARY OF THE INVENTION

Accordingly, the present invention is directed to a DMA processing device and a method thereof that substantially obviates one or more of the problems due to limitations and disadvantages of the related art.

An object of the present invention is to provide a method for processing messages through communications between a main memory device and an RDP (Receive Daemon Process) allotted with the page of the main memory device and managing it, so as to improve the above problems and enhance the communication performance without retransmission of messages due to the absence of DMA information in communication equipment.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a direct memory access processing device of communication equipment includes the following: a main memory device including an area allotted to a process for immediate use, and a daemon process wholly responsible for managing the area; and communication equipment including queues for storing information related to communications between processes, and management tables storing physical addresses in the main memory device allotted to the processs. When information to be managed by a destination process is externally transferred to the communication equipment, the device retrieves information regarding the destination process stored in the queues from the management tables, thereby storing the received information in the addresses of the main memory device via a direct memory access. The management table includes a process record for managing the address of the area allotted in the main memory device for immediate use.

If the communication equipment receives information to be managed by a destination process, and there is no information regarding the physical address in the main memory device allotted to the destination process after the management tables are examined according to information about the queues, the communication equipment searches for the record of the receive daemon process included from the management table, and stores via a direct access the received information in the address of the main memory device which is managed by the record of the receive daemon process.

Additionally, a direct memory access processing method of communication equipment includes the steps of: (1) externally applying information to be managed by a destination process to the communication equipment; (2) retrieving information related to communications of a destination process from the queues; (3) searching for the physical address of the area in the main memory device allotted to be managed by the destination process from the management table according to the result of step (2); (4) when no physical address of the area in the main memory device allotted to be managed by the destination process is found in the management table in step (3), storing the received information in the address of the main memory device stored in a process record in the management table via a direct memory access by the communication equipment, and informing the daemon process in the main memory device of the fact; (5) recognizing by the daemon process that there is information to be managed by the destination process in the area managed by the daemon process itself, and determining whether the free buffer of the destination process exists in the main memory device or in a swapping area; and (6) when the free buffer is in the main memory device, exchanging the content of the page table of the daemon process, storing the address of the main memory device where the information to be managed by the destination process is stored, with that of the page table of the destination process.

In step (6), when the free buffer is in the swapping area, the content of the page table of the daemon process storing the address of the main memory device which holds the information to be managed by the destination process is stored in the page table of the destination process, and a new address of the main memory device is allotted to the page table of the daemon process.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

DETAILED DESCRIPTION OF PREFERRED EMBODIMENT

Reference will now be made in detail to the preferred embodiments of the present invention, examples of which are illustrated in the accompanying drawings.

Figure 1:
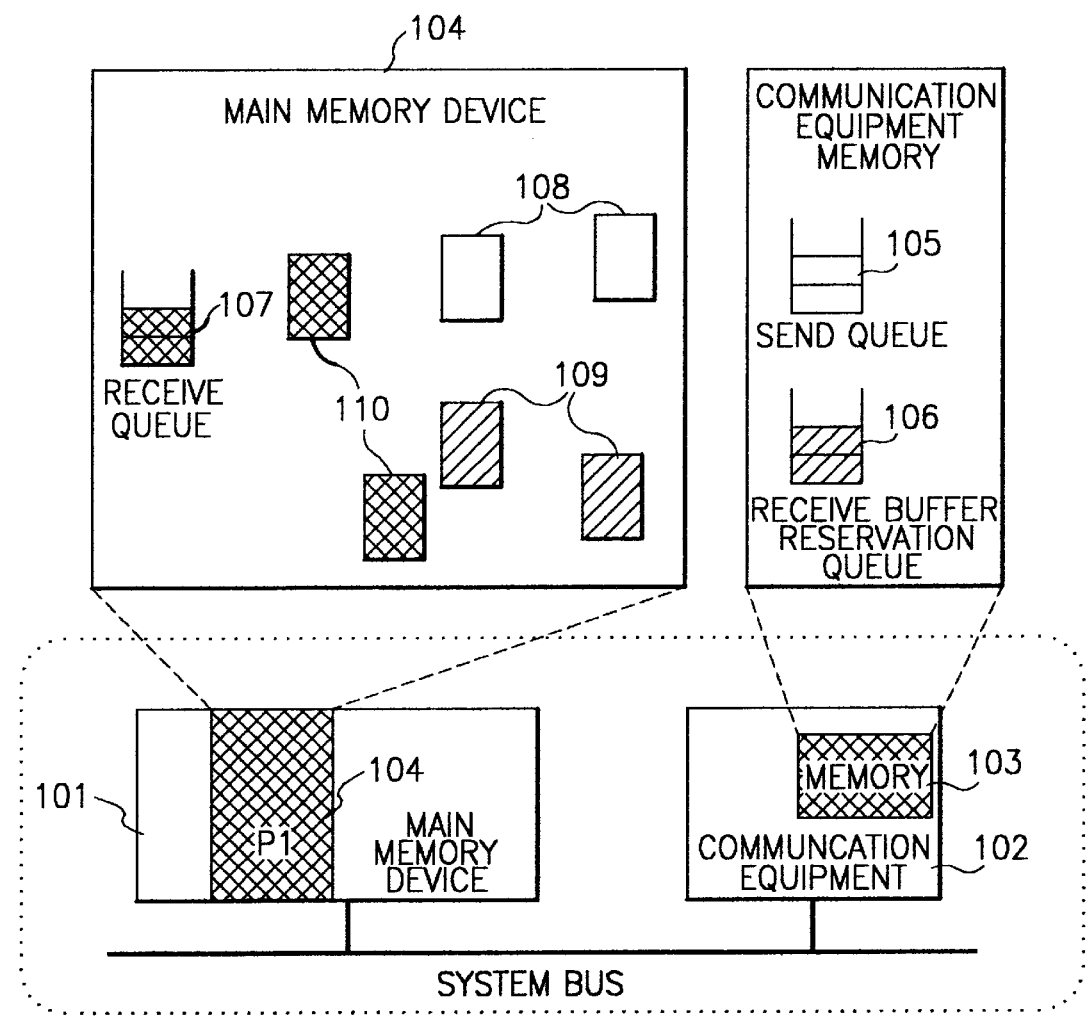
FIG. 1 is a schematic of a DMA processing device between communication equipment and main memory device according to prior art.
Figure 2:
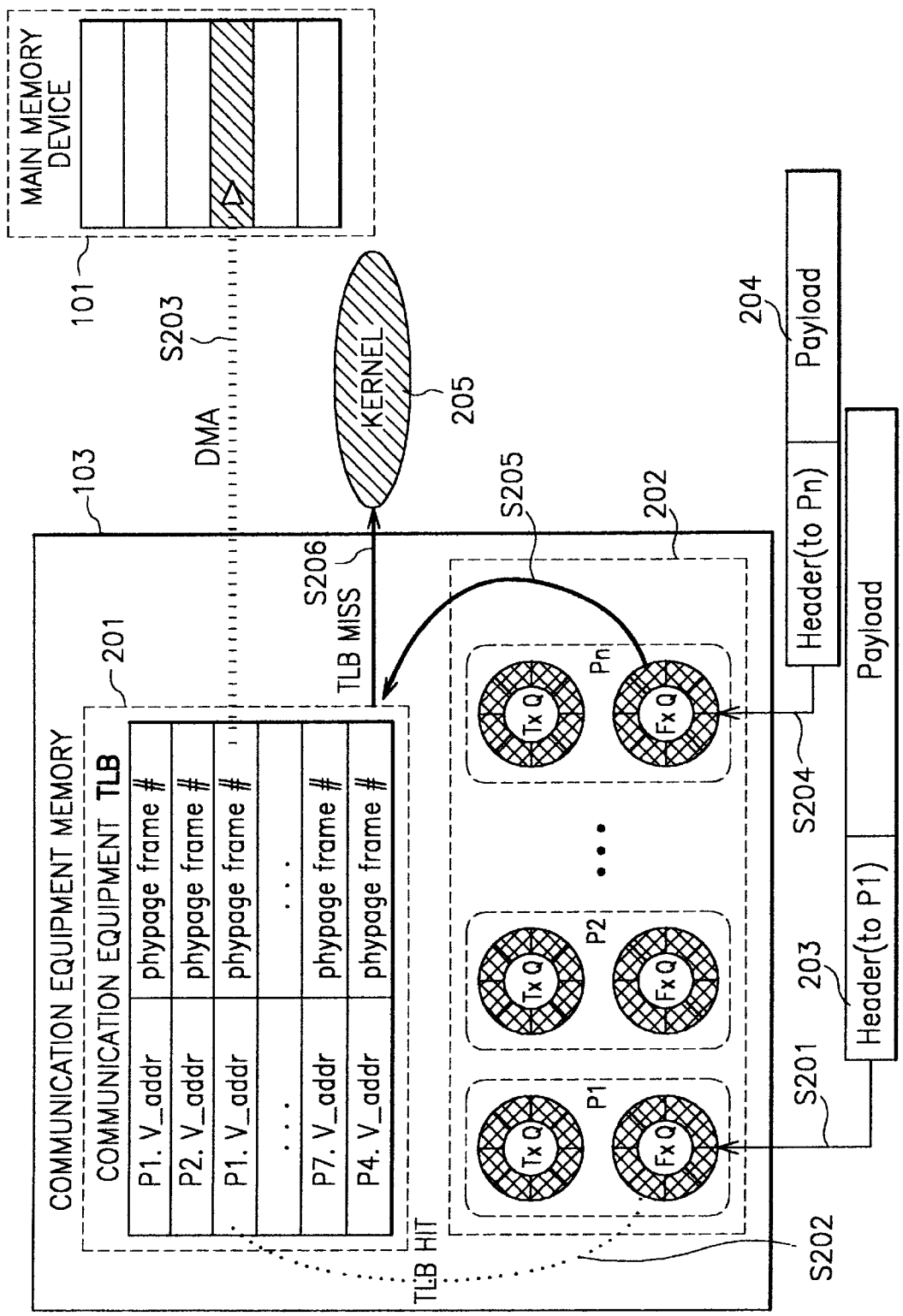
FIG. 2 is a flow diagram illustrating a DMA processing method between communication equipment and main memory device according to prior art.
Figure 3:
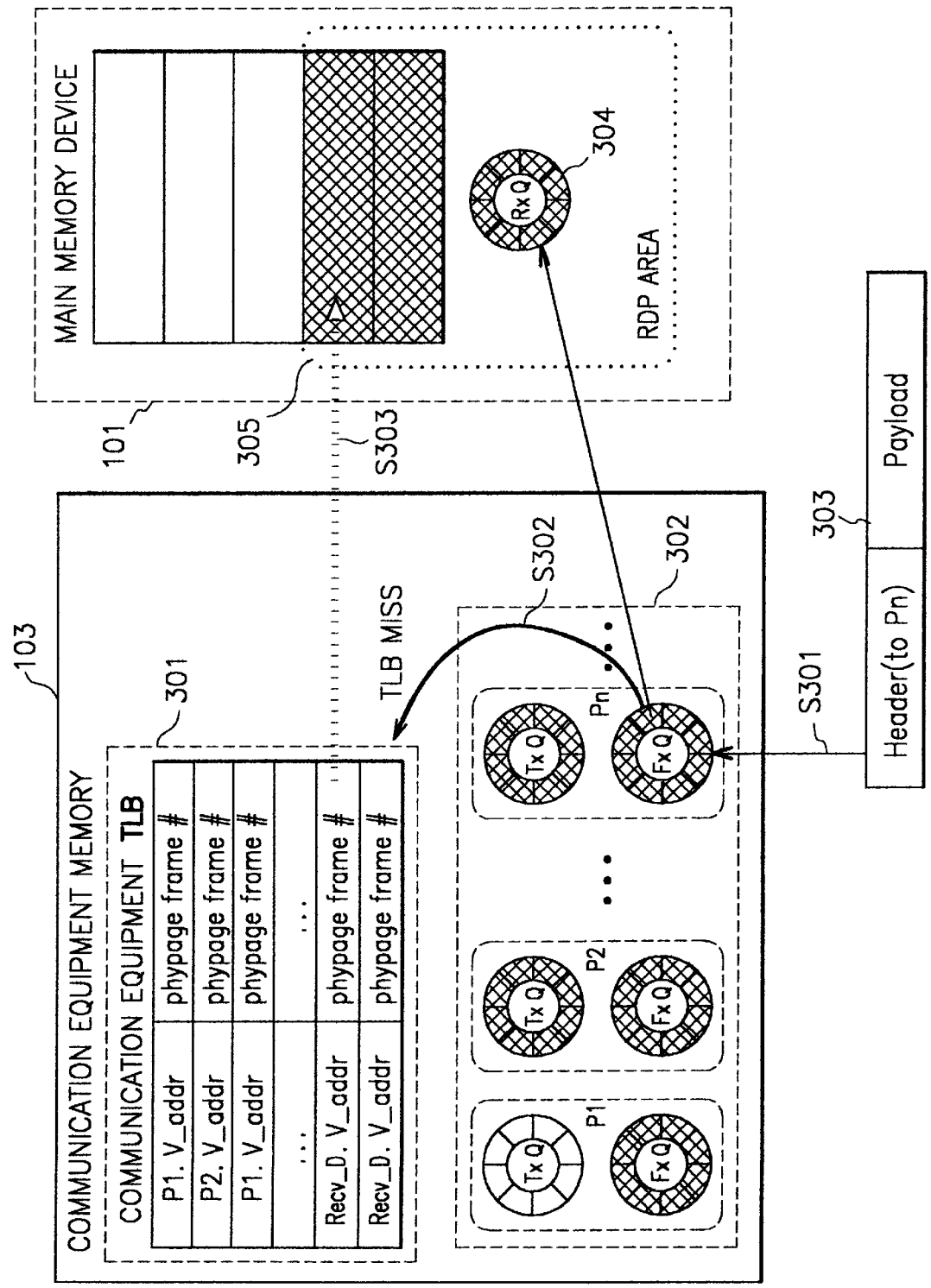
FIG. 3 is a flow diagram of a DMA processing between communication equipment and main memory device in accordance with a preferred embodiment of the present invention.
Figure 4:
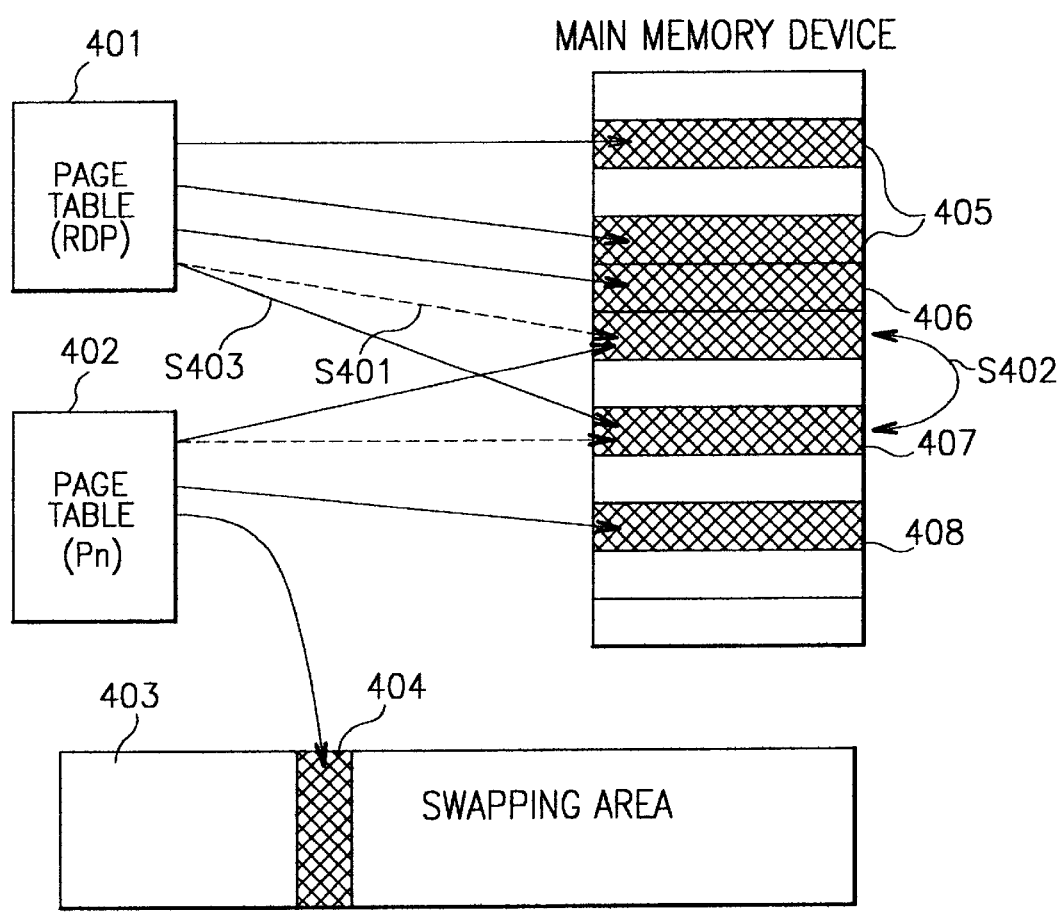
FIG. 4 illustrates a process for exchanging pages between Daemon process and destination processs according to a preferred embodiment of the present invention.
Figure 5:
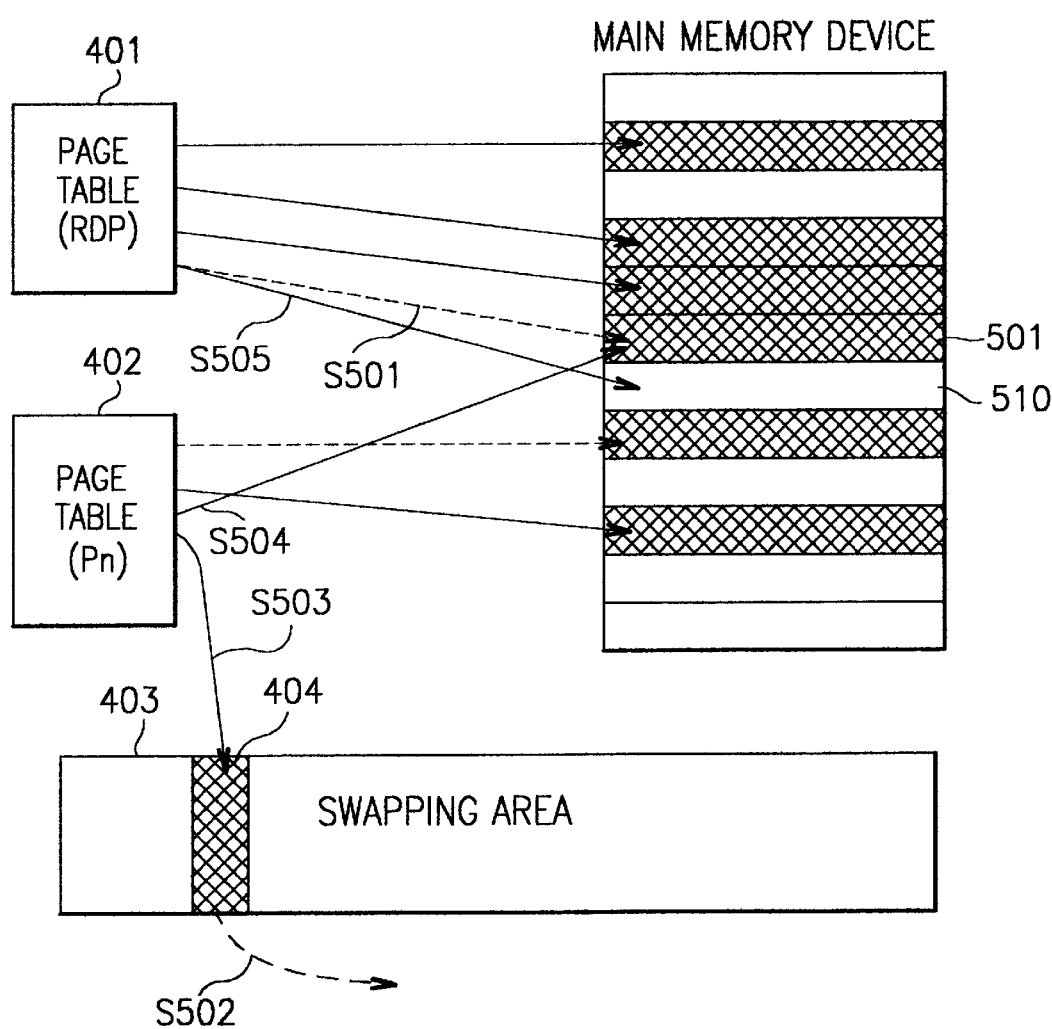
FIG. 5 illustrates a process for exchanging pages between Daemon process and destination processs according to another preferred embodiment of the present invention.

FIG. 3 is a flow diagram of a DMA processing between communication equipment and main memory device in accordance with a preferred embodiment of the present invention. FIGS. 4–5 illustrate the process for exchanging pages between Daemon process and destination processs according to the preferred embodiments of the present invention.

Referring to FIG. 3, a DMA processing device between communication equipment and main memory device in accordance with the present invention comprises: main memory device 101 including an area 305 allotted to be immediately available for a process, and an RDP 304 wholly responsible for managing the area 305; and communication equipment 103 including a queue 302 storing information related to the communications between processs, and TLB 301 to store the physical addresses in the main memory device allotted for the processs and the address of the area 305.

When externally receiving information to be managed by a destination process, communication equipment 103 searches for the TLB 301 through information regarding the destination process stored in the queue 302 to obtain the address of the main memory device for storage. While communication equipment 103 receives a message 303 for the destination process Pn and searches for the physical address in its TLB 301 via queue 302, no information regarding TLB for the destination process Pn is found with a subsequent TLB miss (S302).

As shown in FIG. 3, on receiving the message 303 to be sent to the process Pn (S301), communication equipment 103 finds the ID of the process Pn and the virtual address stored in the main memory device, searching for TLB 301 through information regarding the process Pn obtained via queue 302 (S302). As TLB 301 does not hold the physical address in the main memory device for the process Pn, a TLB miss occurs. In such a case, TLB 301 has the information (Recv_C. V_addr, phypage frame #) of the pages of the main memory device to store the missed message and the actual holder of these pages is RDP 304.

In case of TLB misses (S302), communication equipment 103 transfers the message to be sent to the process Pn via DMA to the page 305 owned by RDP 304 through the information of this page in the RDP 304 (S303). For the purpose, the RDP 304 has to always hold pages of a given amount in the main memory device and store the information in TLB 301. After a DMA for the message, the corresponding information of the receive buffer reservation queue of process Pn is sent to the receive queue 303 of RDP 304 via DMA access in order to transfer the message to the destination process Pn.

In case of TLB misses between communication equipment 103 and main memory device 101, the RDP 304 in the main memory device 101 recognizes that the information to be manages by the destination process Pn lies in the area managed by itself, and determines whether the free buffer of the destination process Pn is in the main memory device 101 or a swapping area.

FIG. 4 illustrates the process of exchanging pages between the RDP and destination process when the free buffer of the destination process is in the main memory device, showing the main memory device, page table 401 for the RDP in the main memory device, page table 402 for the destination process Pn, and swapping area 403. Arrows indicate the respective areas in the main memory device indicated by the page tables.

In case of TLB misses, as described above with reference to FIG. 3, the message to be sent to the destination process Pn is transmitted to the area of the RDP via DMA access and stored in the page of the main memory device 405. The RDP 304, as recognizing pages to exchange with those of the process Pn through its queue, gets an access to the page table 402 of the process Pn to exchange information of its page table 401 and the addresses of the corresponding pages 406 and 407 with the process Pn (S402). When TLB misses occur first, the page table 402 of the process Pn indicates the page 407 with the page table 401 of the RDP 304 indicating the page 406 (S401), and after the RDP 304 recognizes the existence of pages to be exchanged with those of the process Pn, the pages are exchanged with each other (S402). Thus, the page table 401 of the RDP indicates the page 407 and the page table 402 of the process Pn indicates the page 406 (S403).

That is, the content of the page table 406 of the Daemon process storing the address of the main memory device, in which information to be managed by the destination process is stored, is exchanged with that of the page table 407 of the destination process.

FIG. 5 illustrates the process of exchanging pages between the RDP and destination process when the free buffer of the destination process is in the swapping region, showing the main memory device, page table 401 for the RDP in the main memory device, page table 402 for the destination process Pn, and swapping area 403. Arrows indicate the respective areas in the main memory device indicated by the page tables.

In case of TLB misses, without pages for the destination process in the main memory device, the main memory device directly forms a free space instead of reading the pages in the swapping area 403 of the process Pn with a view to rapid exchange of pages (S502), storing the content of page table 501 of RDP, which holds the address of the main memory device storing information to be managed by the destination process Pn, in the page table of the destination process indicating the swapping area (S504) and allotting new address 401 of the main memory device to the page table of the RDP (S505).

When TLB misses occur first, the page table 401 of the RDP 304 indicates the page 501 (S501), with the page table 402 of the process Pn indicating the page 404 of the swapping area (S503). After the RDP 304 recognizes the existence of pages to exchange with those of the process Pn, the content of the page table 402 of the process Pn indicating the pages in the swapping area 403 is deleted (S502), having the page 501 indicated in the area (S504), and new address 510 of the main memory device is allotted to the page table of the RDP that indicated the page 501.

Consequently, the present invention as described above can always secure a space to store incoming messages and the messages are sent to the final destination process without copying the page of the main memory device, which makes it possible to receive messages without inconvenient in communications. That means, TLB misses possibly occurring in the course of message reception can be prevented to avoid message retransmission that might deteriorate the speed and performance of communications. Furthermore, pages are exchanged between the RDP and process participating in communication in a memory, thus overcoming the problems with page faults.

It will be apparent to those skilled in the art that various modifications and variations can be made in the DMA processing device and its method of the present invention without departing from the spirit or scope of the invention. Thus, it is intended that the present invention cover the modifications and variations of this invention provided they come within the scope of the appended claims and their equivalents.

What is claimed is:

1. A direct memory access processing device, comprising:
    a main memory device; and
    communication equipment, including:
        queues which store information related to communications between processes, and
        management tables which store physical addresses in said main memory device allotted to the processes;
    wherein when information to be managed by a destination process is externally transferred to said communication equipment, information regarding the destination process stored in said queues is retrieved from said management tables, and the received information is stored in the addresses of said main memory device via a direct memory access;
    said main memory device comprises:
        an area allotted to a process for immediate use, and
        a daemon process wholly responsible for managing the area; and
    the management table comprises a process record for managing the address of the area allotted in said main memory device for immediate use.

2. A direct memory access device as defined in claim 1, wherein when the communication equipment receives information to be managed by a destination process, and there is no information regarding the physical address in said main memory device allotted to the destination process after said management tables are examined according to information regarding queues, the communication equipment searches for the record of the receive daemon process included in said management table, and stores, via a direct access, the received information in the address of said main memory device which is managed by the record of the receive daemon process.

3. A method of a direct memory accessing communication equipment, which has a main memory device and communication equipment including queues storing information related to communications between processs and management tables storing physical addresses in the main memory device allotted to the processs, and with the communication equipment receiving information, stores the received information in the main memory device via a direct memory access, the main memory device includes an area allotted to a process for the immediate use, and a daemon process wholly responsible for managing the area;

the management table comprising a process record to manage the address of the area allotted in the main memory device for the immediate use;

said method comprises the steps of:

(1) externally applying information to be managed by a destination process to the communication equipment;

(2) retrieving information related to communications of a destination process from the queues;

(3) searching for a physical address of the area in the main memory device allotted to be managed by the destination process from the management table according to the result of step (2);

(4) when no physical address of the area in the main memory device allotted to be managed by the destination process is found in the management table in step (3), storing the received information in the address of the main memory device stored in a process record in the management table via a direct memory access by the communication equipment, and informing the daemon process in the main memory device of the fact;

(5) recognizing by the daemon process that there is information to be managed by the destination process in the area managed by the daemon process itself, and determining whether the free buffer of the destination process exists in the main memory device or in a swapping area; and (6) when the free buffer is in the main memory device, exchanging the content of the page table of the daemon process, storing the address of the main memory device where the information to be managed by the destination process is stored, with that of the page table of the destination process.

4. The method as defined in claim 3, wherein in step (6), when the free buffer is in the swapping area, the content of the page table of the daemon process storing the address of the main memory device which holds the information to be managed by the destination process is stored in the page table of the destination process, and a new address of the main memory device is allotted to the page table of the daemon process.

* * * * *